US011635287B2

(12) United States Patent
Backes

(10) Patent No.: US 11,635,287 B2
(45) Date of Patent: Apr. 25, 2023

(54) MAGNET-BASED ROTARY ANGLE SENSOR SYSTEM

(71) Applicant: FRABA B.V., SG Heerlen (NL)

(72) Inventor: Andreas Backes, Aachen (DE)

(73) Assignee: FRABA B.V., S.G. Heeerlen (NL)

( * ) Notice: Subject to any disclaimer, the term of this patent is extended or adjusted under 35 U.S.C. 154(b) by 99 days.

(21) Appl. No.: 17/239,700

(22) Filed: Apr. 26, 2021

(65) Prior Publication Data

US 2021/0333087 A1 Oct. 28, 2021

(30) Foreign Application Priority Data

Apr. 27, 2020 (DE) ...................... 10 2020 111 404.4

(51) Int. Cl.
*G01B 7/30* (2006.01)
*G01D 5/14* (2006.01)

(52) U.S. Cl.
CPC ............... *G01B 7/30* (2013.01); *G01D 5/145* (2013.01)

(58) Field of Classification Search
CPC .......... G01B 7/30; G01D 5/145; G01P 3/4815
See application file for complete search history.

(56) References Cited

U.S. PATENT DOCUMENTS

| 9,664,535 | B2 * | 5/2017 | Tatei | ..................... | G01D 5/2006 |
| 2007/0188163 | A1 | 8/2007 | Jagiella et al. | | |
| 2015/0354986 | A1 | 12/2015 | Mehnert et al. | | |
| 2018/0010926 | A1 * | 1/2018 | Forthaus | ............. | H02K 11/215 |
| 2019/0316934 | A1 * | 10/2019 | Chong | .................... | G01D 5/14 |
| 2020/0141764 | A1 * | 5/2020 | Wang | ................. | G01R 33/0011 |

FOREIGN PATENT DOCUMENTS

| DE | 10 2006 003 993 A1 | 7/2007 |
| DE | 20 2015 103 893 U1 | 11/2015 |
| DE | 10 2018 203 409 A1 | 9/2019 |

* cited by examiner

*Primary Examiner* — Reena Aurora
(74) *Attorney, Agent, or Firm* — Norman B. Thot

(57) ABSTRACT

A magnet-based rotary angle sensor system for detecting a shaft rotation. The magnet-based rotary angle sensor system includes a rotatable excitation unit which is mounted to a shaft for rotation therewith, and a static sensor unit. The rotatable excitation unit includes at least one excitation magnet. The static sensor unit detects an excitation-magnetic field generated by the at least one excitation magnet. The static sensor unit includes a first Wiegand sensor module and a second Wiegand sensor module which are arranged in a cross-shaped manner and axially spaced from each other.

13 Claims, 5 Drawing Sheets

MAGNET-BASED ROTARY ANGLE SENSOR SYSTEM

CROSS REFERENCE TO PRIOR APPLICATIONS

Priority is claimed to German Patent Application No. DE 10 2020 111 404.4, filed Apr. 27, 2020. The entire disclosure of said application is incorporated by reference herein.

FIELD

The present invention relates to a magnet-based rotary angle sensor system for detecting a shaft rotation, the magnet-based rotary angle sensor system comprises a rotatable excitation unit which is configured to be mounted to a shaft for rotation therewith and which includes at least one excitation magnet, and a static sensor unit manner for detecting an excitation-magnetic field generated by the at least one excitation magnet, the sensor unit comprising a sensor unit housing and two Wiegand sensor modules arranged in a cross-shape.

BACKGROUND

The directional information "axial" and "radial" as used below always refers to the shaft to be subjected to detection by the rotary angle sensor system, irrespective of whether the rotary angle sensor system is mounted to the shaft or not. An axial direction is thus to be understood as a direction parallel to the longitudinal shaft axis in the installed condition of the rotary angle sensor system, and a radial plane is to be understood as a plane extending transversely to the longitudinal shaft axis in the installed condition of the rotary angle sensor system.

Rotary angle sensor systems, which are also known as a rotary encoder or a rotary angle encoder, can be used in complex industrial plants, for example, for detecting the rotation of a machine shaft. Rotary angle sensor systems can also be used in fluid flow measuring assemblies to detect the flow in a gas or in a pipe for liquids, wherein the shaft to be subjected to detection is driven by the fluid flow via an impeller.

Magnet-based rotary angle sensor systems here generally include a magnetic excitation unit which is configured to be mounted to a shaft for rotation therewith and at least one permanent-magnetic excitation magnet. Due to the rotation of the shaft, the magnetic excitation unit typically generates an alternating excitation-magnetic field at the position of a static sensor device, which magnetic field is detected by the sensor device. So-called Wiegand sensor modules are here frequently used a sensor device which operate according to the Wiegand principle, i.e., utilize the Wiegand effect for detecting the excitation-magnetic field.

Wiegand sensor modules always comprise a pulse wire, also referred to as a Wiegand wire, and a sensor coil which is typically wound around the pulse wire. The pulse wire abruptly changes its magnetization under the influence of an external magnetic field, here the excitation-magnetic field, whereby a detectable voltage pulse is generated in the sensor coil. When the shaft rotates, the alternating excitation magnet consequently generates a sequence of detectable voltage pulses in the Wiegand sensor module, wherein a rotary angle of the shaft can be determined on the basis of the number of detected voltage pulses, and a rotational speed of the shaft can be determined on the basis of the frequency of the voltage pulses.

DE 20 2015 103 893 U1 describes a rotary angle sensor system comprising a rotatable excitation unit which is configured to be mounted to a shaft for rotation therewith and including at least one excitation magnet, and a static sensor unit including a sensor unit housing and two Wiegand sensor modules arranged in a cross-shaped manner and configured to detect an excitation-magnetic field generated by the at least one excitation magnet. The two Wiegand sensor modules are here arranged in a cross-shaped manner to enable a particularly reliable and exact detection of the excitation-magnetic field and thus a particularly reliable and exact detection of the shaft rotation.

The described sensor unit requires, however, specific and difficult-to-manufacture, and thereby cost-intensive, Wiegand sensor modules which each include a special sensor coil comprising a winding-free coil portion. The described sensor unit also requires a relatively large installation space due to the winding-free coil portions with a preset number of windings of the sensor coil being provided.

SUMMARY

An aspect of the present invention is to provide a reliable and exact rotary angle sensor system which is inexpensive to manufacture and which requires a relatively small radial installation space.

In an embodiment, the present invention provides a magnet-based rotary angle sensor system for detecting a shaft rotation. The magnet-based rotary angle sensor system includes a rotatable excitation unit which is configured to be mounted to a shaft for rotation therewith, and a static sensor unit. The rotatable excitation unit comprises at least one excitation magnet. The static sensor unit is configured to detect an excitation-magnetic field generated by the at least one excitation magnet. The static sensor unit comprises a first Wiegand sensor module and a second Wiegand sensor module which are arranged in a cross-shaped manner and axially spaced from each other.

BRIEF DESCRIPTION OF THE DRAWINGS

The present invention is described in greater detail below on the basis of embodiments and of the drawings in which.

DETAILED DESCRIPTION

Figure 1:
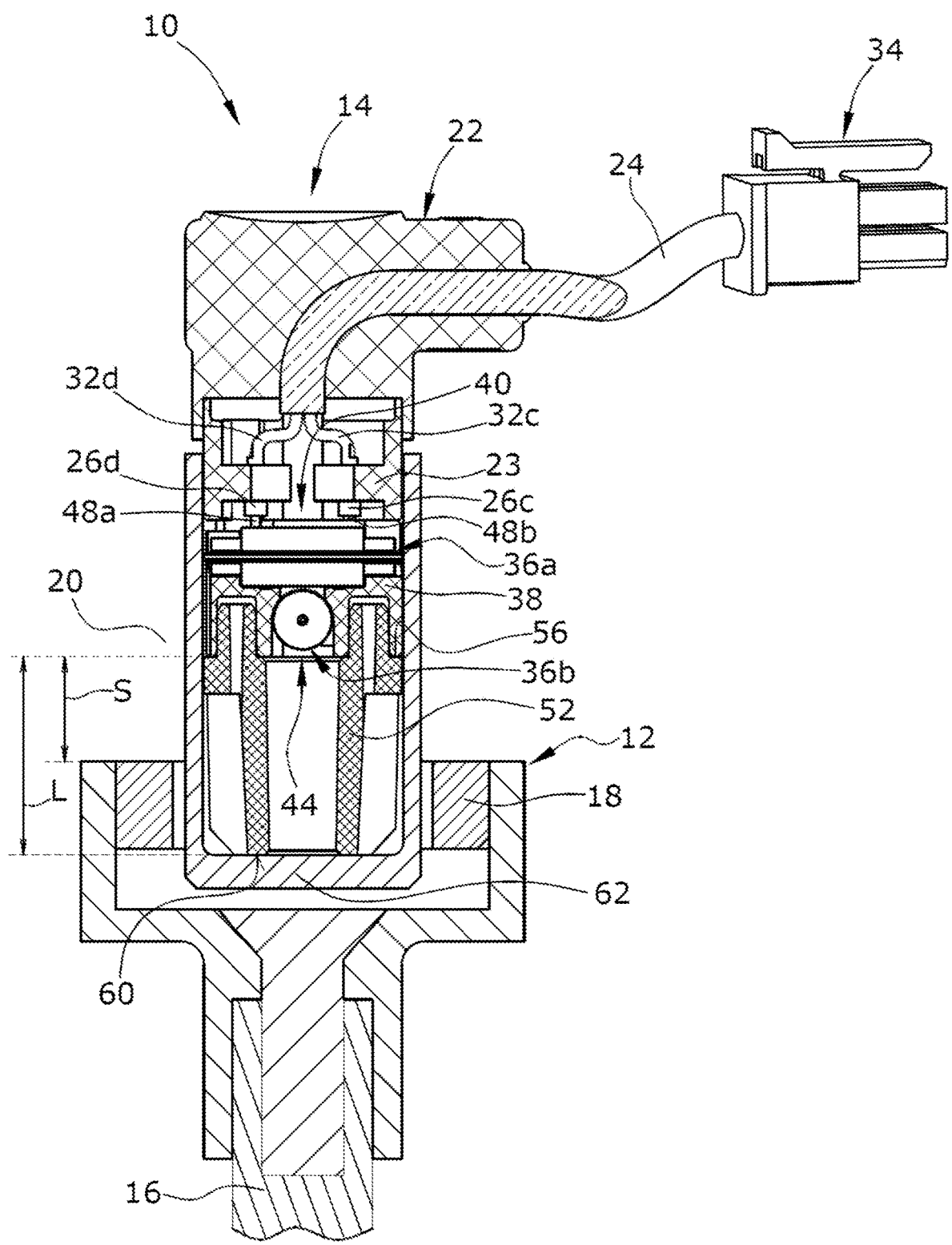
FIG. 1 shows a side view of a longitudinal section of a rotary angle sensor system according to the present invention.
Figure 2:
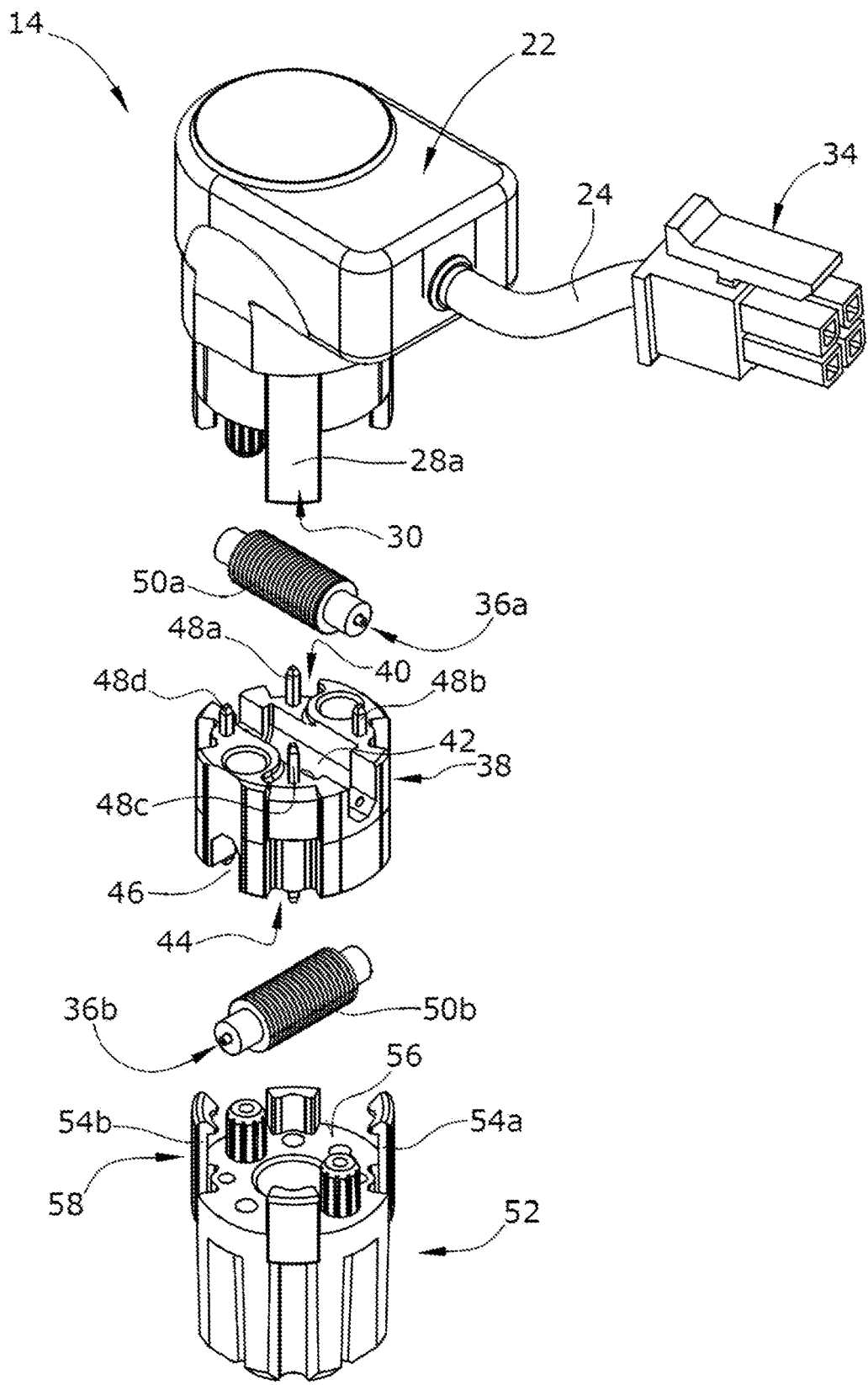
FIG. 2 shows an exploded view of a sensor unit of the rotary angle sensor system of FIG. 1.

According to the present invention, the two Wiegand sensor modules are arranged axially spaced from each other, i.e., the two Wiegand sensor modules have a significant distance to each other in the axial direction. Since the two Wiegand sensor modules do not intersect, no winding-free sensor coil portion need be provided on the sensor coils of the Wiegand sensor modules. This allows for use of conventional, inexpensive and compact Wiegand sensor modules.

The Wiegand sensor modules arranged axially spaced from each other according to the present invention thus allows for a rotary angle sensor system which is inexpensive to manufacture and which requires a relatively small radial installation space.

In an embodiment, the present invention provides a sensor module support body to which the two Wiegand sensor modules can, for example, be fastened. The two Wiegand sensor modules can be easily fastened to the sensor module support body which is accessible from all sides during installation of the rotary angle sensor system. This allows for a particularly simple installation of the two Wiegand sensor modules since the two Wiegand sensor modules can be installed completely independent of each other. The Wiegand sensor modules can further be particularly exactly and reliably positioned and aligned. The sensor module support body with the two Wiegand sensor modules fastened thereto can be fastened as a preassembled unit in a subsequent installation step. This enables a simple and thus inexpensive installation of the rotary angle sensor system.

The first Wiegand sensor module is advantageously arranged at a first side of the sensor module support body, and the second Wiegand sensor module is advantageously arranged at a second side of the sensor module support body which is opposite the first side. This enables a particularly simple and reliable installation of the two Wiegand sensor modules and makes a simultaneous installation of the two Wiegand sensor modules possible.

In an embodiment of the present invention, the sensor module support body can, for example, include a first recess at the first side where the first Wiegand sensor module is arranged, and the sensor module support body can, for example, include a second recess at the second side where the second Wiegand sensor is arranged. The predefined recesses provide that the two Wiegand sensor modules are exactly and reliably positioned and aligned relative to each other without a complex alignment of the Wiegand sensor modules being required during installation. The recesses hence enable a simple and reliable installation of the Wiegand sensor modules on the sensor module support body, and thus a simple installation of the rotary angle sensor system.

In an embodiment of the present invention, four electrically conducting, for example, pin-shaped contact elements can, for example, be arranged within the sensor module support body. Two of the four contact elements are electrically connected to the first Wiegand sensor module, and the other two contact elements are electrically connected to the second Wiegand sensor module. In particular, one contact element is electrically connected to a first sensor coil end of the first Wiegand sensor module, one contact element is electrically connected to a second sensor coil end of the first Wiegand sensor module, one contact element is electrically connected to a first sensor coil end of the second Wiegand sensor module, and one contact element is electrically connected to a second sensor coil end of the second Wiegand sensor module. Typically, the two contact elements electrically connected to the first Wiegand sensor module protrude from the sensor module support body at the first side, and the two contact elements electrically connected to the second Wiegand sensor module protrude from the sensor module support body at the second side so that the corresponding sensor coil ends are adapted to be easily fastened to the contact elements in an electrically conducting manner. The sensor coil ends can, for example, be soldered to the contact elements. The contact elements enable a simple and reliable electrical contacting of the two Wiegand sensor modules.

All four contact elements can, for example, protrude from the sensor module support body at the first side. Access from only one side of the sensor module support body is thus required for contacting the two Wiegand sensor modules. This enables an easy contacting of the two Wiegand sensor modules, for example, via a connecting device arranged in/at a sensor unit housing.

In an embodiment of the present invention, a connecting cable accessible from outside can, for example, be provided which is electrically connected to all four contact elements. The connecting cable comprises at least four conductors via which the four contact elements are adapted to be individually electrically contacted. A standardized plug can, for example, be provided at the outer end of the connecting cable. Via the connecting cable, the rotary angle sensor system, in particular the two Wiegand sensor modules of the rotary angle sensor system, is adapted to be easily electrically connected to an external evaluation unit.

A separate sensor unit housing can, for example, be provided to which the sensor module support body can, for example, be fastened via a first snap-fit mechanism. The first snap-fit mechanism can, for example, comprise a plurality of snap-fits which are formed at the sensor unit housing and which engage with corresponding recesses of the sensor module support body or grip behind corresponding shoulders of the sensor module support body. The first snap-fit mechanism enables a simple fastening of the sensor module support body to the sensor unit housing and thus a simple installation of the rotary angle sensor system.

Four contact sleeves can, for example, be fastened to the sensor unit housing, which, in the installed condition of the rotary angle sensor system, are each electrically connected to the connecting cable and each contact in an electrically conducting manner a respective one of the contact elements protruding from the sensor module support body. Due to the contact sleeves fastened to the sensor unit housing, no separate installation step for electrically connecting the contact elements to the connecting cable is required during the installation of the sensor module support body to the sensor unit housing. The contact sleeves further provide a reliable electrical connection between the contact elements and the connecting cable. The contact sleeves thus enable a simple and reliable installation of the rotary angle sensor system.

The sensor unit housing can, for example, comprise an injection-molded housing part which is manufactured by injection molding, the housing part being injection-molded around the four contact sleeves. The contact sleeves are thus embedded in the injection-molded housing part and thus reliably fastened to the injection-molded housing part. This enables a reliable positioning and alignment of the contact sleeves at/in the sensor unit housing.

In an embodiment of the present invention, optional adapter elements having different adapter element axial lengths can, for example, be installed at a side of the sensor module support body so that an axial sensor distance between the at least one excitation magnet and the sensor module support body with the two Wiegand sensor modules is adjustable via the different adapter element axial lengths. By selecting a corresponding adapter element, the axial distance between the at least one excitation magnet and the two Wiegand sensor modules can be easily adjusted as required. A rotary angle sensor system is thus provided which is adjustable in a simple manner for use with various measuring assemblies and/or at various installation sites and is thus versatilely usable.

A second snap-fit mechanism can, for example, be provided via which an adapter element is fastened to the sensor module support body in the installed condition of the rotary angle sensor system. The second snap-fit mechanism can, for example, comprise a plurality of snap-fits which are formed at the adapter element and which engage with corresponding recesses of the sensor module support body or grip behind corresponding shoulders of the sensor module support body. The second snap-fit mechanism enables a simple fastening of the adapter element to the sensor module support body. The second snap-fit mechanism further, for example, enables a simple exchange of the adapter element for adapting the rotary angle sensor system to a new measuring assembly or a new installation site. An easy-to-install and versatilely usable rotary angle sensor system is thus provided.

An exemplary embodiment of a rotary angle sensor system according to the present invention is described in detail below under reference to the accompanying drawings.

FIG. 1 shows a rotary angle sensor system 10 according to the present invention which comprises a rotatable excitation unit 12 and a static sensor unit 14.

As illustrated in FIG. 1, the excitation unit 12 is typically configured to be mounted, via a screw connection, to a shaft 16 for rotation therewith and comprises at least one permanent-magnetic excitation magnet 18 which generates an excitation-magnetic field.

As illustrated in FIG. 1, the sensor unit 14 is typically fixedly installed in/at an installation device 20 at the installation site.

Figure 3:
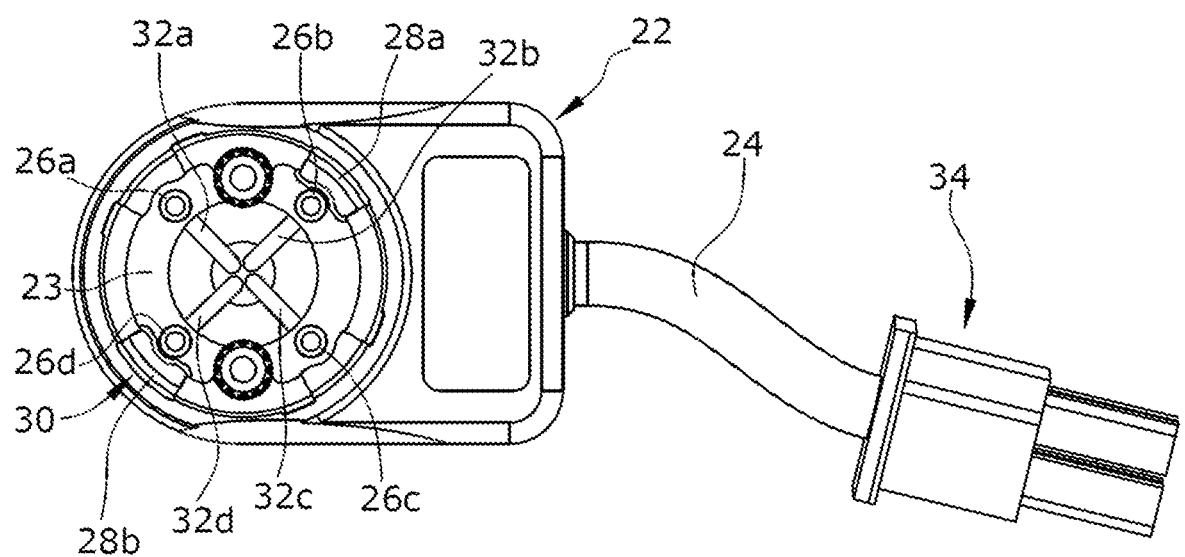
FIG. 3 shows a top view of the lower side of a sensor unit housing of the sensor unit of FIG. 2.
Figure 4:
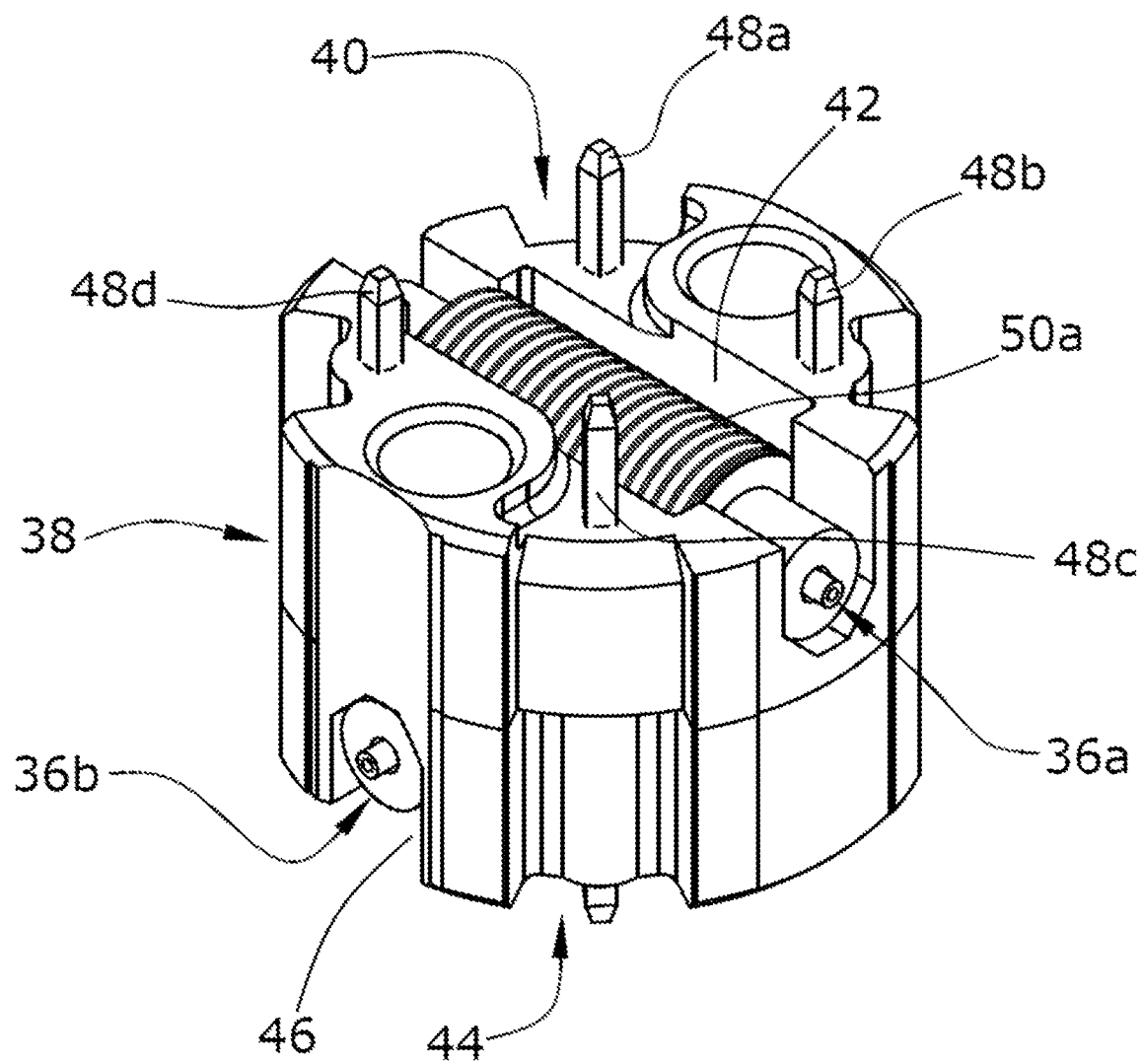
FIG. 4 show a sensor module support body with Wiegand sensor modules mounted thereto of the rotary angle sensor system of FIG. 1.

The sensor unit 14 comprises a sensor unit housing 22 to which a connecting cable 24 accessible from outside and, as illustrated in FIG. 3, four contact sleeves 26a-d, are fastened. In the present exemplary embodiment, the sensor unit housing 22 comprises an injection-molded housing part 23 which is manufactured by injection molding, the injection-molded housing part 23 being injection-molded around the contact sleeves 26a-d.

Two snap-fits 28a,b are formed at the sensor unit housing 22 which, at a housing side facing the excitation unit 12, axially protrude beyond a front surface of the sensor unit housing 22 extending in a radial plane, the two snap-fits 28a,b constituting a first snap-fit mechanism 30.

The connecting cable 24 comprises four electrically conducting cable conductors 32a-d which, at their outer ends, are each connected to a connecting plug 34 in an electrically conducting manner and which at their opposite inner ends are each connected to one of the four contact sleeves 26a-d in an electrically conducting manner.

The sensor unit 14 further comprises two Wiegand sensor modules 36a,b for detecting the excitation-magnetic field generated by the excitation magnet 18 and a sensor module support body 38 to which the two Wiegand sensor modules 36a,b are fastened.

At a first axial side 40 facing the sensor unit housing 22, the sensor module support body 38 includes a first recess 42 where the first Wiegand sensor module 36a is arranged, and at a second axial side which is opposite the first axial side 40 and which faces the excitation unit 12, the sensor module support body 38 includes a second recess 46 where the second Wiegand sensor module 36b is arranged. The first Wiegand sensor module 36a is thus arranged at the first axial side 40 of the sensor module support body 38, and the second Wiegand sensor module 36b is thus arranged at the second axial side 44 of the sensor module support body 38. The two recesses 42, 46 are configured perpendicular to each other so that the two Wiegand sensor modules 36a,b are arranged in a cross-shaped manner. The two recesses 42, 46 are further configured so that the two Wiegand sensor modules 36a,b are arranged axially spaced from each other.

Four pin-shaped electrically conducting contact elements 48a-d are arranged within the sensor module support body 38 for electrically contacting the two Wiegand sensor modules 36a,b. The contact elements 48a-d axially extend through the sensor module support body 38 and respectively extend from the sensor module support body 38 both at the first axial side 40 and at the second axial side 44. The first contact element 48a and the third contact element 48c are electrically connected to the first Wiegand sensor module 36a. The second contact element 48b and the fourth contact element 48d are electrically connected to the second Wiegand sensor module 36b. The contact elements 48a-d are in particular each connected, for example, soldered, in an electrically conducting manner to one end of the sensor coil 50a,b of the corresponding Wiegand sensor module 36a,b.

The sensor module support body 38 is fastened to the sensor unit housing 22 via the first snap-fit mechanism 30 so that the sensor unit housing 22 is arranged at the first axial side 40 of the sensor module support body 38. The snap-fits 28a,b of the first snap-fit mechanism 30 here grip behind corresponding shoulders of the sensor module support body 38.

In the installed condition of the rotary angle sensor system 10, the ends of the contact elements 48a-d protruding from the sensor module support body 38 at the first axial side 40 are each immersed in one of the contact sleeves 26a-d fastened to the sensor unit housing 22 and contact them in an electrically conducting manner. The connecting plug 34 is therefore connected to the contact elements 48a-d in an electrically conducting manner via the connecting cable 24 and the contact sleeves 26a-d and are thus connected to the two Wiegand sensor modules 36a-b in an electrically conducting manner so that in the two Wiegand sensor modules 36a,b sensor voltage pulses generated by the excitation-magnetic field are adapted to be detected from outside via the connecting plug 34, for example, via an external evaluation unit.

The sensor unit 14 further comprises an adapter element 52 which is arranged at the second axial side 44 of the sensor module support body 38 facing the excitation unit 12. The adapter element 52 includes two snap-fits 54a,b which axially protrude, at an adapter element side facing the sensor module support body 38, beyond a first adapter element front surface 56 extending in a radial plane. The snap-fits 54a,b constitute a second snap-fit mechanism 58 via which the adapter element 52 is fastened to the sensor module support body 38. The snap-fits 54a,b here grip behind corresponding shoulders of the sensor module support body 38.

During the installation of the rotary angle sensor system 10 at the installation site, the sensor unit 14 is pushed into the installation device 20 until a second adapter element front surface 60 located opposite the first adapter element front surface 56 abuts on a bottom wall 62 of the installation device 20.

An axial sensor distance S between the excitation magnet 18 and the sensor module support body 38 in the installed condition of the rotary angle sensor system 10 is thus adjustable via an adapter element axial length L of the adapter element 52, which is here defined as the axial distance between the first adapter element front surface 56 and the second adapter element front surface 60.

The rotary angle sensor system 10 is therefore configured so that optional adapter elements 52; 52' having different adapter element axial lengths L; L' are adapted to be mounted to the sensor module support body 38 for adjusting the axial sensor distance S as required.

Figure 5:
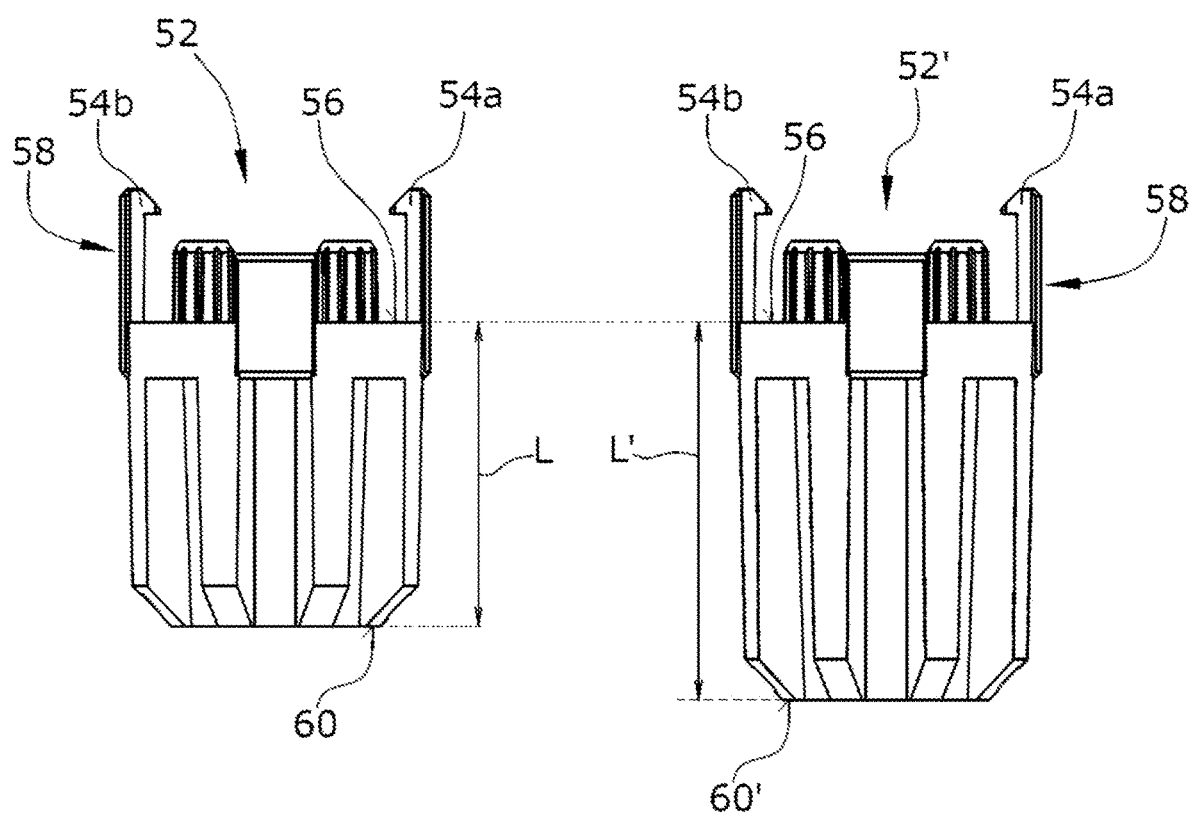
FIG. 5 shows two adapter elements of the rotary angle sensor system of FIG. 1, wherein the two adapter elements have different adapter element axial lengths.

FIG. 5 shows an example of two adapter elements 52, 52' which are configured to be mounted to the sensor module support body 38 and which have different axial lengths L, L'.

The present invention is not limited to embodiments described herein; reference should be had to the appended claims.

LIST OF REFERENCE NUMERALS

10 Rotary angle sensor system
12 Excitation unit
14 Sensor unit
16 Shaft
18 Excitation magnet
20 Installation device
22 Sensor unit housing
23 Injection-molded housing part
24 Connecting cable
26*a-d* Contact sleeves
28*a* Snap-fit
28*b* Snap-fit
30 First snap-fit mechanism
32*a-d* Cable conductors
34 Connecting plug
36*a* First Wiegand sensor module
36*b* Second Wiegand sensor module
38 Sensor module support body
40 First axial side (of sensor module support body)
42 First recess
44 Second axial side (of sensor module support body)
46 Second recess
48*a* First contact element
48*b* Second contact element
48*c* Third contact element
48*d* Fourth contact element
50*a* Sensor coil
50*b* Sensor coil
52, 52' Adapter element
54*a* Snap-fit
54*b* Snap-fit
56 First adapter element front surface
58 Second snap-fit mechanism
60, 60' Second adapter element front surface
62 Bottom wall (of installation device)
L; L' Adapter element axial length
S Axial sensor distance

What is claimed is:

1. A magnet-based rotary angle sensor system for detecting a shaft rotation, the magnet-based rotary angle sensor system comprising:
a rotatable excitation unit which is configured to be mounted to a shaft for rotation therewith, the rotatable excitation unit comprising at least one excitation magnet; and
a static sensor unit which is configured to detect an excitation-magnetic field generated by the at least one excitation magnet, the static sensor unit comprising a first Wiegand sensor module and a second Wiegand sensor module which are arranged in a cross-shaped manner and axially spaced from each other.

2. The magnet-based rotary angle sensor system as recited in claim 1,
further comprising:
a sensor module support body which is configured to have each of the first Wiegand sensor module and the second Wiegand sensor module be fastened thereto.

3. The magnet-based rotary angle sensor system as recited in claim 2,
wherein,
the first Wiegand sensor module is arranged at a first side of the sensor module support body, and
the second Wiegand sensor module is arranged at a second side of the sensor module support body which is opposite to the first side of the sensor module support body.

4. The magnet-based rotary angle sensor system as recited in claim 3,
wherein,
the sensor module support body comprises a first recess at the first side and a second recess at the second side,
the first Wiegand sensor module is arranged in the first recess, and
the second Wiegand sensor module is arranged in the second recess.

5. The magnet-based rotary angle sensor system as recited in claim 2, wherein the sensor module support body comprises four electrically conducting contact elements, two of the four electrically conducting contact elements being electrically connected to the first Wiegand sensor module, and the other two of the four electrically conducting contact elements being electrically connected to the second Wiegand sensor module.

6. The magnet-based rotary angle sensor system as recited in claim 5, wherein each of the four electrically conducting contact elements is arranged to protrude from the sensor module support body at the first side.

7. The magnet-based rotary angle sensor system as recited in claim 5,
further comprising:
a connecting cable which is configured to be electrically connected to each of the four electrically conducting contact elements.

8. The magnet-based rotary angle sensor system as recited in claim 7, further comprising:
a separate sensor unit housing which is configured to have the sensor module support body be fastened thereto; and
four contact sleeves each of which is fastened to the separate sensor unit housing,
wherein,
each of the four contact sleeves is connected to the connecting cable in an electrically conducting manner,
each of the four electrically conducting contact elements is arranged to protrude from the sensor module support body, and
a respective one of the four contact sleeves contacts a respective one of the four electrically conducting contact elements in an electrically conductive manner.

9. The magnet-based rotary angle sensor system as recited in claim 8, wherein the separate sensor unit housing comprises an injection-molded housing part which is molded around the four contact sleeves.

10. The magnet-based rotary angle sensor system as recited in claim 2, further comprising:
a separate sensor unit housing which is configured to have the sensor module support body be fastened thereto.

11. The magnet-based rotary angle sensor system as recited in claim 10, further comprising:
a first snap-fit mechanism,
wherein,
the fastening of the sensor module support body to the separate sensor unit housing is provided by the first snap-fit mechanism.

12. The magnet-based rotary angle sensor system as recited in claim 2,
further comprising:
an adapter element with an adapter element axial length, the adapter element being configured to be installed at a side of the sensor module support body so that, via the adapter element axial length, an axial sensor distance between the at least one excitation magnet and the sensor module support body comprising the first Wiegand sensor module and second Wiegand sensor module is adjustable.

13. The magnet-based rotary angle sensor system as recited in claim 12, further comprising:
a second snap-fit mechanism via which the adapter element is fastened to the sensor module support body.

* * * * *